United States Patent
Chen et al.

(10) Patent No.: US 10,720,779 B2
(45) Date of Patent: Jul. 21, 2020

(54) QUICK CHARGING SYSTEM, TERMINAL, POWER ADAPTER AND CHARGING LINE

(71) Applicant: GUANGDONG OPPO MOBILE TELECOMMUNICATIONS CORP., LTD., Dongguan, Guangdong (CN)

(72) Inventors: Xinfeng Chen, Guangdong (CN); Chen Tian, Guangdong (CN); Jialiang Zhang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/435,530

(22) Filed: Jun. 9, 2019

(65) Prior Publication Data
US 2019/0296569 A1    Sep. 26, 2019

Related U.S. Application Data

(63) Continuation of application No. 16/310,955, filed as application No. PCT/CN2017/078884 on Mar. 30, 2017.

(30) Foreign Application Priority Data

Jul. 28, 2016 (CN) .......................... 2016 1 0608768

(51) Int. Cl.
*H02J 7/00* (2006.01)
*H01M 10/44* (2006.01)
(Continued)

(52) U.S. Cl.
CPC ......... *H02J 7/00034* (2020.01); *H01M 10/44* (2013.01); *H01R 31/02* (2013.01);
(Continued)

(58) Field of Classification Search
CPC .......... H02J 7/0052; H02J 7/04; H02J 7/0045; H02J 7/02; H02J 2007/0062;
(Continued)

(56) References Cited

U.S. PATENT DOCUMENTS

| 5,218,286 A | 6/1993 | Vandunk |
| 2002/0169915 A1 | 11/2002 | Wu |

(Continued)

FOREIGN PATENT DOCUMENTS

| CN | 201113783 | 9/2008 |
| CN | 202737499 | 2/2013 |

(Continued)

OTHER PUBLICATIONS

SIPO, First Office Action for CN Application No. 201610608768, dated Jun. 1, 2017.
(Continued)

*Primary Examiner* — Richard Isla
*Assistant Examiner* — Manuel Hernandez
(74) *Attorney, Agent, or Firm* — Hodgson Russ LLP

(57) ABSTRACT

The present disclosure provides a charging system, a terminal, a power adapter and a charging line. The terminal includes a first controller and M charging input interfaces. The power adapter includes a second controller and N charging output interfaces. When at least one of the N charging output interface is coupled to the charging input interfaces of the terminal, the second controller and the first controller communicate with each other to determine the number of charging output interfaces of the power adapter coupled to the terminal, and a charging current outputted from the power adapter to the terminal is adjusted according to the number of charging output interfaces of the power adapter coupled to the terminal.

10 Claims, 4 Drawing Sheets

(51) Int. Cl.
*H02J 7/04* (2006.01)
*H01R 31/02* (2006.01)
*H01R 31/06* (2006.01)

(52) U.S. Cl.
CPC ............... *H01R 31/06* (2013.01); *H02J 7/00* (2013.01); *H02J 7/00032* (2020.01); *H02J 7/0045* (2013.01); *H02J 7/04* (2013.01); *Y02B 40/90* (2013.01); *Y02E 70/40* (2013.01)

(58) Field of Classification Search
CPC .. H02J 7/00034; H02J 7/00032; H01R 31/06; H01R 31/02; H01M 10/44; Y02B 40/90; Y02E 70/40
USPC .......................................................... 320/107
See application file for complete search history.

(56) References Cited

U.S. PATENT DOCUMENTS

| | | | |
|---|---|---|---|
| 2005/0253560 A1* | 11/2005 | Popescu-Stanesti | H02J 1/08 320/138 |
| 2008/0111522 A1 | 5/2008 | Simpson et al. | |
| 2015/0137789 A1 | 5/2015 | Furtner | |
| 2015/0180254 A1 | 6/2015 | Zhao | |
| 2015/0214763 A1 | 7/2015 | Kim et al. | |

FOREIGN PATENT DOCUMENTS

| | | |
|---|---|---|
| CN | 103219770 | 7/2013 |
| CN | 203071364 | 7/2013 |
| CN | 203151126 | 8/2013 |
| CN | 103532187 | 1/2014 |
| CN | 104079022 | 10/2014 |
| CN | 204131189 | 1/2015 |
| CN | 204376478 | 6/2015 |
| CN | 204669001 | 9/2015 |
| CN | 104979886 | 10/2015 |
| CN | 104993182 | 10/2015 |
| CN | 204886307 | 12/2015 |
| CN | 205070534 | 3/2016 |
| CN | 105515084 | 4/2016 |
| CN | 105656092 | 6/2016 |
| CN | 205406887 | 7/2016 |
| CN | 106100084 | 11/2016 |

OTHER PUBLICATIONS

SIPO, Third Office Action for CN Application No. 201610608768, dated Dec. 12, 2017.
NIPO, ISR for PCT/CN2017/078884, dated Jun. 14, 2017.
SIPO, Second Office Action for CN Application No. 201610608768, dated Sep. 13, 2017.
SIPO, Notification to Grant Patent Right for Invention for CN Application No. 201610608768, dated Mar. 20, 2018.
EPO, Office Action for EP Application No. 17833223.5, dated Jun. 24, 2019.
IPO, Office Action for IN Application No. 201917002732, dated Mar. 9, 2020.
USPTO, Office Action for U.S. Appl. No. 16/310,955, dated Feb. 21, 2020.

* cited by examiner

QUICK CHARGING SYSTEM, TERMINAL, POWER ADAPTER AND CHARGING LINE

CROSS-REFERENCE TO RELATED APPLICATIONS

The present application is a continuation of U.S. application Ser. No. 16/310,955, filed Dec. 18, 2018, which is a U.S. National Stage Entry of International Application No. PCT/CN2017/078884, filed Mar. 30, 2017, which claims priority to Chinese Patent Application No. 201610608768.6, filed Jul. 28, 2016. The entire disclosures of the aforementioned applications are incorporated herein by reference.

FIELD

The present disclosure relates to the field of charging technologies, and more particularly to a charging system, a terminal, a power adapter and a charging line.

BACKGROUND

Quick charging is a charging method in which a storage battery reaches or nearly reaches a fully charged state. A popular research topic focused by people is how to realize quick charging without damaging a performance and service life of the storage battery.

SUMMARY

The present disclosure aims to solve one of technical problems in the related art to at least some extent.

A charging system provided by embodiments of a first aspect of the present disclosure includes: a terminal, including a first controller and M charging input interfaces, where M is an integer greater than 1; and a power adapter, including a second controller and N charging output interface, wherein, when at least one of the N charging output interfaces is coupled to the charging input interfaces of the terminal, the second controller and the first controller communicate with each other to determine a number of charging output interfaces of the power adapter coupled to the terminal, and a charging current outputted from the power adapter to the terminal is adjusted according to the number of charging output interfaces of the power adapter coupled to the terminal, where N is an integer greater than 1.

A terminal provided by embodiments of a second aspect of the present disclosure includes: M charging input interfaces, where M is an integer greater than 1; a battery; and a first controller, coupled to the M charging input interfaces and the battery respectively, and configured to determine a number of charging output interfaces of a power adapter coupled to the charging input interfaces when at least one of N charging output interfaces of the power adapter is coupled to the charging input interfaces, and to adjust via the power adapter a charging current outputted from the power adapter to the battery according to the number of charging output interfaces of the power adapter coupled to the charging input interfaces, where N is an integer greater than 1.

A power adapter provided by embodiments of a third aspect of the present disclosure includes: a power supply module; N charging output interfaces, where N is an integer greater than 1; and a second controller, coupled to the power supply module and the N charging output interfaces respectively, and configured to determine a number of charging output interfaces coupled to a terminal when at least one of the N charging output interfaces is coupled to charging input interfaces of the terminal, and to adjust a charging current outputted from the power supply module to the terminal according to the number of charging output interfaces coupled to the terminal.

A charging line provided by embodiments of a fourth aspect of the present disclosure includes: a connecting line; M first interfaces, coupled with a first end of the connecting line, and arranged to match charging input interfaces of a terminal; and N second interfaces, coupled with a second end of the connecting line, and arranged to match charging output interfaces of a power adapter, where M and N are integers greater than 1.

EMBODIMENTS OF THE PRESENT DISCLOSURE

Figure 1:
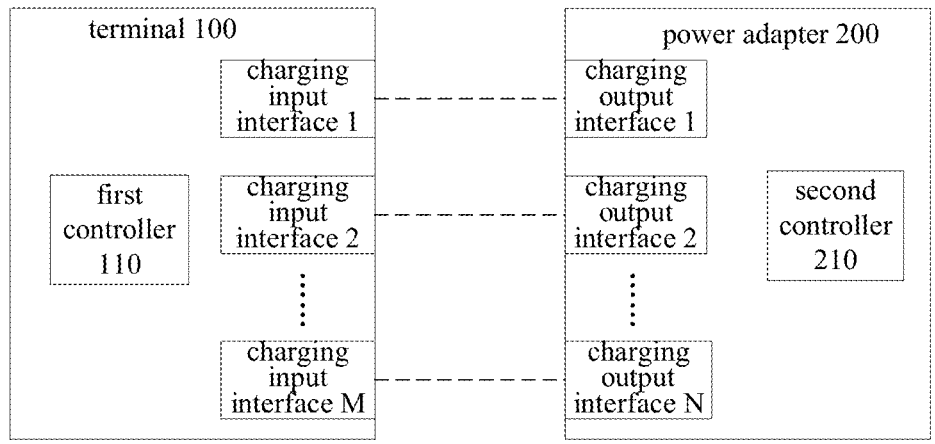
FIG. 1 is a block diagram of a charging system according to embodiments of the present disclosure.

Embodiments of the present disclosure will be described in detail below. Examples of the embodiments are illustrated in drawings, in which the same or similar elements and the elements having same or similar functions are denoted by like reference numerals throughout the descriptions. The embodiments described herein with reference to drawings are explanatory, and used to explain the present disclosure. The embodiments shall not be construed to limit the present disclosure.

At present, quick charging is mainly realized by enhancing a charging current. However, limited to an overcurrent capacity of a charging output interface of a charging device and a charging input interface of a device to be charged, it is difficult to enhance the charging current.

For this, embodiments of the present disclosure provide a charging system, a terminal, a power adapter, and a charging line.

In the following, a charging system, a terminal, a power adapter and a charging line according to embodiments of the present disclosure will be described with reference to drawings.

FIG. 1 is a block diagram of a charging system according to embodiments of the present disclosure. As illustrated in FIG. 1, the charging system includes a terminal 100 and a power adapter 200.

The terminal 100 includes a first controller 110 and M charging input interfaces. The power adapter 200 includes a second controller 210 and N charging output interfaces. When at least one of the charging output interface is coupled to the charging input interface of the terminal 100, the second controller 210 and the first controller 110 communicate with each other to determine the number of charging output interfaces coupled to the terminal 100, and a charging current outputted from the power adapter 200 to the terminal 100 is adjusted according to the number of charging output interfaces of the power adapter 200, which are coupled to the terminal 100, where M and N are integers greater than 1.

In detail, quick charging of the terminal 100 can be achieved by enhancing the charging current outputted from the power adapter 200 to the terminal 100. However, when enhancing the charging current, it is necessary to consider whether both the charging output interface of the power adapter 200 and the charging input interface of the terminal 100 can satisfy the requirement of the charging current. In general, an overcurrent capacity of a single charging input interface and a single charging output interface (for example, a USB interface) is limited, and if this problem is not solved, it is difficult to enhance the charging current.

For this, in embodiments of the present disclosure, a plurality of charging input interfaces can be arranged on the terminal, and a plurality of charging output interfaces can be arranged on the power adapter 200. When there is a need for quick charging, the plurality of charging output interfaces of the terminal 100 can be coupled with the plurality of charging input interfaces of the power adapter 200, and then the charging current outputted from the power adapter 200 to the terminal 100 is adjusted according to the number of charging output interfaces of the power adapter 200, which are coupled to the terminal 100, such that the power adapter 200 may charge the terminal 100 via the plurality of interfaces, thus effectively enhancing the charging current, and achieving the purpose of quick charging.

According to an embodiment of the present disclosure, when the number of charging output interfaces of the power adapter 200, which are coupled to the terminal 100, is k, the charging current outputted from the power adapter 200 to the terminal 100 is adjusted to k times a preset charging current, where k is an integer greater than or equal to 1.

In detail, assume that each of the charging input interfaces and the charging output interfaces has the same overcurrent capacity, and the corresponding charging current is the preset charging current, then when the number of charging output interfaces of the power adapter 200 which are coupled to the terminal 100 is k, the charging current outputted from the power adapter 200 to the terminal can be enhanced to k time the preset charging current.

For example, when one charging input interface of the terminal 100 is coupled with one charging output interface of the power adapter 200, the charging current is 1 times the preset charging current; when two charging input interfaces of the terminal 100 are coupled with two charging output interfaces of the power adapter 200, the charging current is 2 times the preset charging current, each interface being corresponding to 1 times the preset charging current; and so on. With the system, the terminal is charged via the plurality of charging input interfaces and the plurality of charging output interfaces, which may effectively solve the problem of being unable to enhance the charging current due to the limited overcurrent capacity of a single charging output interface and a single charging input interface, and thus solve the problem of quick charging.

Further, in embodiments of the present disclosure, the number of charging output interfaces coupled to the terminal 100 may be determined by the first controller 110 or the second controller 210.

According to an embodiment of the present disclosure, the second controller 210 is configured to determine the number of charging output interfaces of the power adapter 200 coupled to the terminal 100, and to adjust the charging current outputted from the power adapter 200 to the terminal 100 according to the number of charging output interfaces of the power adapter 200 coupled to the terminal 100.

In detail, when the power adapter 200 enables the charging function, the second controller 210 can send a preset signal to respective charging output interfaces in sequence. If the second controller 210 receives a signal fed back from the first controller 110, it indicates that the corresponding charging output interface is coupled with the charging input interface of the terminal 100. The second controller 210 records the number of all the charging output interfaces coupled to the terminal 100, and adjusts the charging current according to the number of charging output interfaces.

According to another embodiment of the present disclosure, the first controller 110 is configured to determine the number of charging output interfaces of the power adapter 200 coupled to the terminal 100, and to adjust via the second controller 210, the charging current outputted from the power adapter 200 to the terminal 100 according to the number of charging output interfaces of the power adapter 200 coupled to the terminal 100.

In detail, when the terminal 100 enables the charging function, the first controller 110 can send a preset signal to respective charging input interfaces in sequence. If the first controller 110 receives a signal fed back from the second controller 210, it indicates that the corresponding charging input interface is coupled with the charging output interface of the power adapter 200. The first controller 110 records the number of all the charging output interfaces coupled to the terminal 100, and sends the number of charging output interfaces to the second controller 210, such that the second controller 210 adjusts the charging current according to the number of charging output interfaces.

Figure 2:
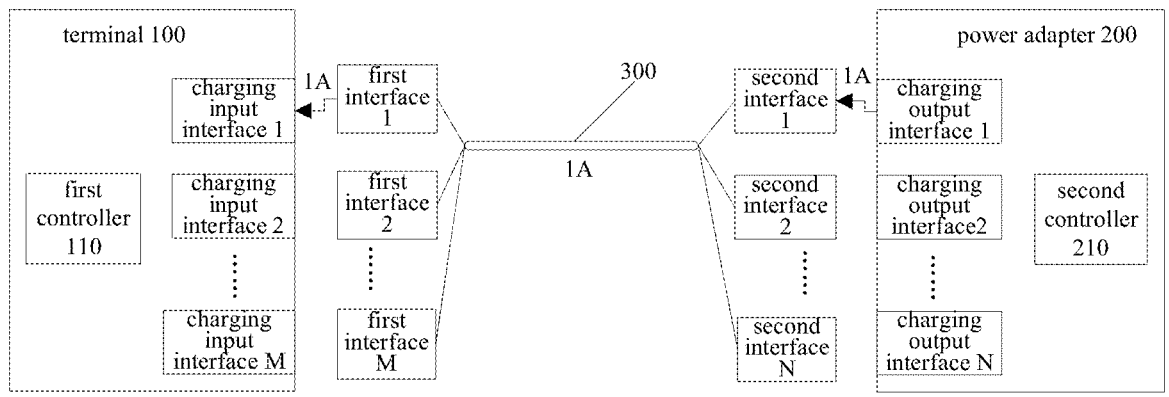
FIG. 2 is a block diagram of a charging system accord to an embodiment of the present disclosure.
Figure 3:
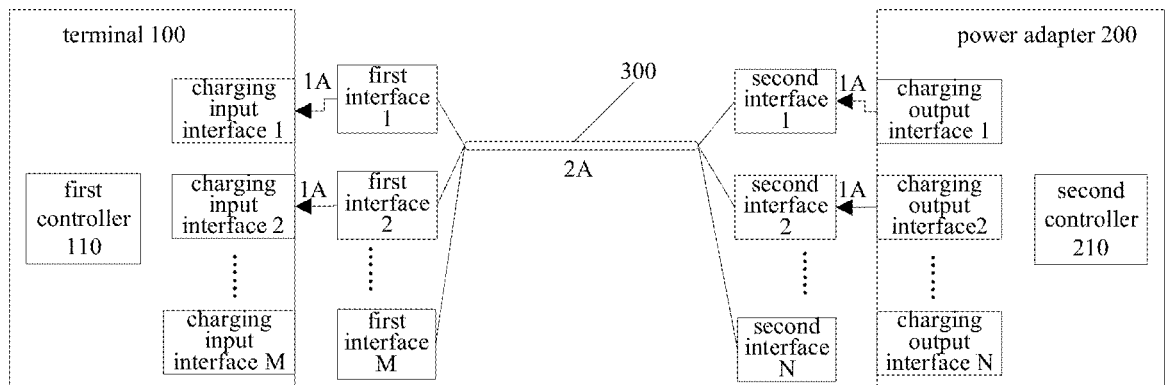
FIG. 3 is a block diagram of a charging system according to another embodiment of the present disclosure.

According to an embodiment of the present disclosure, as illustrated in FIG. 2 and FIG. 3, the charging system further includes a charging line 300. A first end of the charging line 300 includes M first interfaces matching the M charging input interfaces. A second end of the charging line 300 includes N second interfaces matching the N charging output interfaces. The charging output interface of the power adapter 200 is coupled to the charging input interface of the terminal via the charging line 300.

In detail, as illustrated in FIG. 2, wherein there is no need for quick charging, the first interface 1 of the charging line 300 is coupled with the charging input interface 1, and the second interface 1 is coupled with the charging output interface 1. In this case, the charging current outputted from the power adapter 200 to the terminal 100 is one times the preset charging current.

As illustrated in FIG. 3, wherein there is a need for quick charging, the first interface 1 and the first interface 2 of the charging line 300 can be coupled with the charging input interface 1 and the charging input interface 2 respectively, and the second interface 1 and the second interface 2 of the charging line can be coupled with the charging output interface 1 and the charging output interface 2 respectively. In this case, the charging current outputted from the power adapter 200 to the terminal 100 is two times the preset charging current.

Each of the M charging input interfaces, the M first interfaces, the N second interfaces and the N charging output interfaces may be a USB interface.

Further, according to an embodiment of the present disclosure, each of the M charging input interfaces is coupled to a preset power supply via a pull-up resistor, and each of the M first interfaces is grounded via a pull-down resistor. Each of the N charging output interfaces is coupled to a preset power supply via a pull-up resistor, and each of the N second interfaces is grounded via a pull-down resistor. The number of charging output interfaces of the power adapter which are coupled to the terminal is determined according to a voltage of each charging input interface and a voltage of each charging output interface.

Figure 4A:
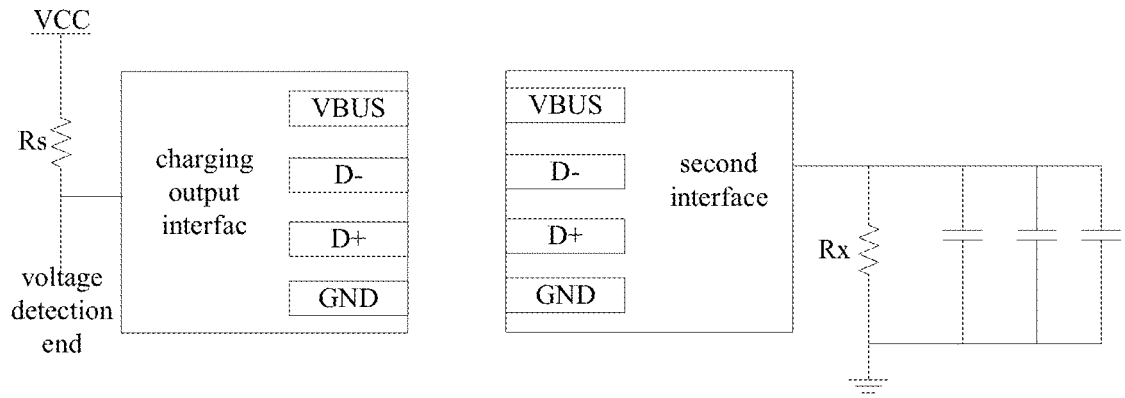
FIG. 4a and FIG. 4b are schematic diagrams of a charging output interface and a second interface according to an embodiment of the present disclosure.
Figure 4B:
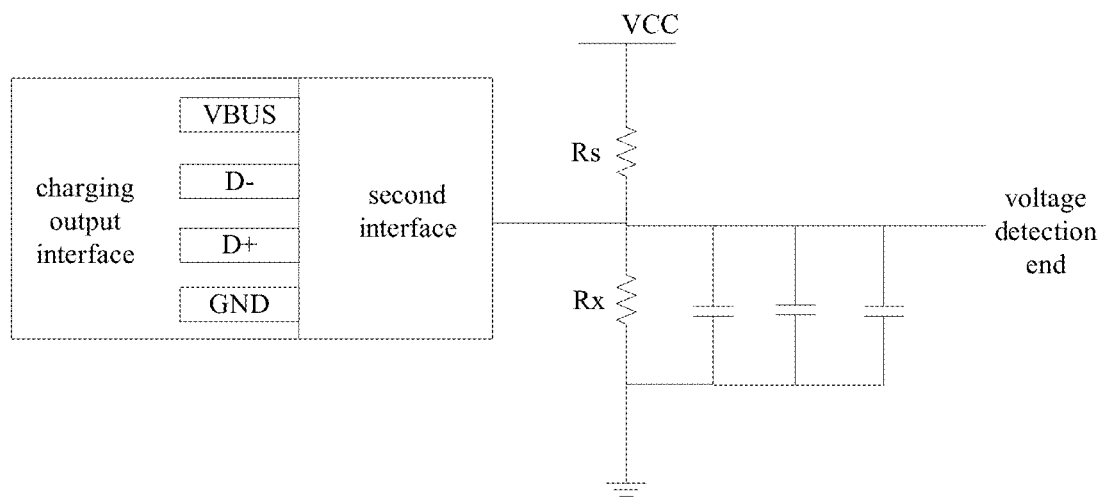

In detail, as illustrated in FIG. 4a, the charging output interface and the second interface may be a USB interface (VBUS is a power terminal, GND is a ground terminal, D+ and D− are data terminals). The charging output interface is coupled with the preset power supply VCC (the voltage of which may be 3.3V) via the pull-up resistor Rs, and the second interface is grounded via the pull-down resistor Rx. The second controller 210 determines whether the charging output interface is coupled with the second interface by detecting the voltage at the voltage detection end (i.e., the voltage of the USB interface) in real time. When the voltage of the USB interface detected by the second controller 210 is 3.3V, the charging output interface is not coupled with the second interface. As illustrated in FIG. 4b, when the voltage of the USB interface detected by the second controller 210 is less than 3.3V, the charging output interface is coupled with the second interface. In this way, the second controller 210 may automatically detect whether the charging output interface is coupled with the second interface and the number of the charging output interfaces coupled with the second interfaces.

Similarly, in the above way, the first controller 110 may also automatically detect whether the charging input interface is coupled with the first interface and the number of charging input interfaces coupled with the first interfaces. Then, the controller 110 and the second controller 210 communicate with each other, to determine the number of charging output interfaces of the power adapter 200 which are coupled to the terminal 100. For example, a minimum of the detected numbers can be used as the final number of charging output interfaces coupled to the terminal. The first controller 110 and the second controller 210 may also communicate with each other via the charging line 300, to determine the number of charging output interfaces coupled to the terminal, avoiding the wrong number of coupled charging output interfaces when interconnected with other devices.

It should be noted that, in embodiments of the present disclosure, the charging line 300 may be a wire harness, the wire harness consisting of a plurality of single connecting lines, each single connecting line being coupled with one first interface and one second interface. Or, the charging line 300 may consist of one connecting line, one first interface, and one second interface, and when there is a need for quick charging, the power adapter can be coupled with the terminal via a plurality of charging lines.

In conclusion, with the charging system according to embodiments of the present disclosure, the terminal includes the first controller and M charging input interfaces, the power adapter includes the second controller and N charging output interfaces, and when at least one of the N charging output interfaces is coupled to the charging input interfaces of the terminal, the second controller and the first controller communicate with each other to determine the number of charging output interfaces of the power adapter coupled to the terminal, and the charging current outputted from the power adapter to the terminal is adjusted according to the number of charging output interfaces of the power adapter coupled to the terminal. With the system, the terminal is charged via a plurality of charging input interfaces and a plurality of charging output interfaces, which effectively solves the problem of being unable to enhance a charging current due to a limited overcurrent capacity of a single charging input interface and a single charging output interface, and thus solve the problem of quick charging.

Figure 5:
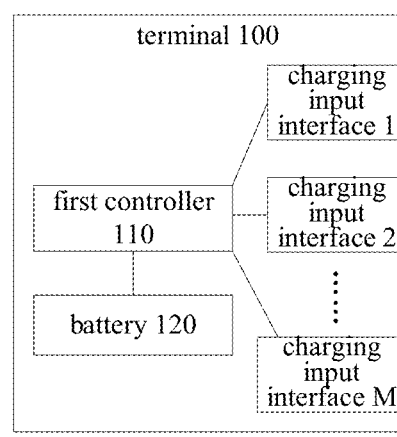
FIG. 5 is a block diagram of a terminal according to embodiments of the present disclosure.

FIG. 5 is a block diagram of a terminal according to embodiments of the present disclosure. As illustrated in FIG. 5, the terminal 100 includes M charging input interfaces, a first controller 110 and a battery 120.

The first controller 110 is coupled with the M charging input interfaces and the battery 120 respectively. The first controller 110 is configured to determine a number of charging output interfaces of a power adapter coupled to the charging input interfaces at least one of N charging output interfaces of the power adapter is coupled to the charging input interfaces, and to adjust via the power adapter a charging current outputted from the power adapter to the battery 120 according to the number of charging output interfaces of the power adapter coupled to the charging input interfaces, where N is an integer greater than 1.

In detail, a plurality of charging input interfaces may be provided on the terminal 100. When there is a need for quick charging, the plurality of charging input interfaces may be coupled with a plurality of charging output interfaces of the power adapter. Then, the first controller 110 determines the number of charging output interfaces coupled to the charging input interfaces, and sends the number to the power adapter, such that the power adapter adjusts the charging current outputted to the battery 120 according to the number.

According to an embodiment of the present disclosure, when the number of charging output interfaces of the power adapter which are coupled to the charging input interfaces is k, the first controller 110 adjusts via the power adapter, the charging current outputted from the power adapter to the battery 120 to k times a preset charging current, where k is an integer greater than or equal to 1.

In detail, assume that each of the charging input interfaces and the charging output interfaces has the same overcurrent capacity, and the corresponding charging current is the preset charging current, then when the number of charging output interfaces of the power adapter which are coupled to the terminal is k, the charging current outputted from the power adapter to the battery 120 can be enhanced to k time the preset charging current.

For example, when one charging input interface of the terminal 100 is coupled with one charging output interface of the power adapter, the charging current is 1 times the preset charging current; when two charging input interfaces of the terminal 100 are coupled with two charging output interfaces of the power adapter, the charging current is 2 times the preset charging current, each interface being corresponding to 1 times the preset charging current; and so on. With the terminal, the battery is charged via the plurality of charging input interfaces, which may effectively solve the problem of being unable to enhance the charging current due to the limited overcurrent capacity of a single charging input interface, and thus solve the problem of quick charging.

According to an embodiment of the present disclosure, each of the M charging input interfaces is coupled to a preset power supply via a pull-up resistor, and the first controller 110 is configured to determine the number of charging output interfaces of the power adapter coupled to the charging input interfaces according to the voltage of each charging input interface. Each of the M charging input interfaces may be a USB interface.

Figure 6A:
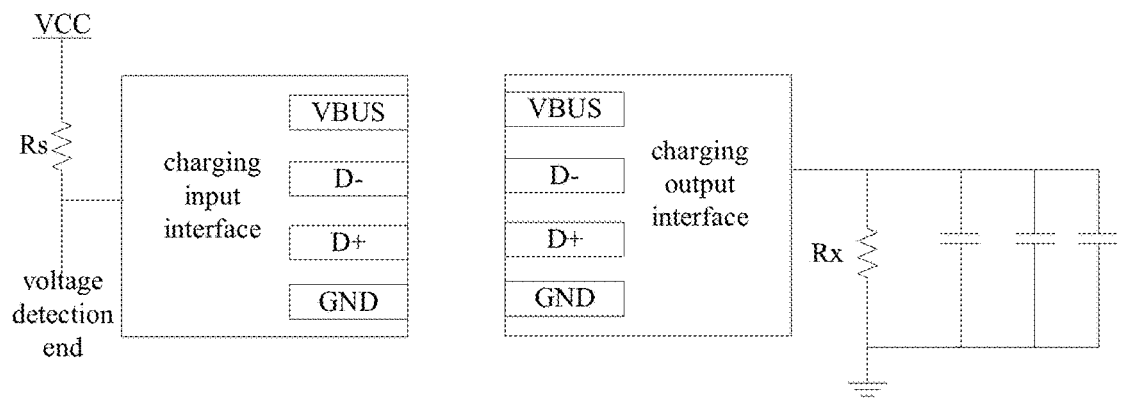
FIG. 6a and FIG. 6b are schematic diagrams of a charging input interface and a charging output interface according to an embodiment of the present disclosure.
Figure 6B:
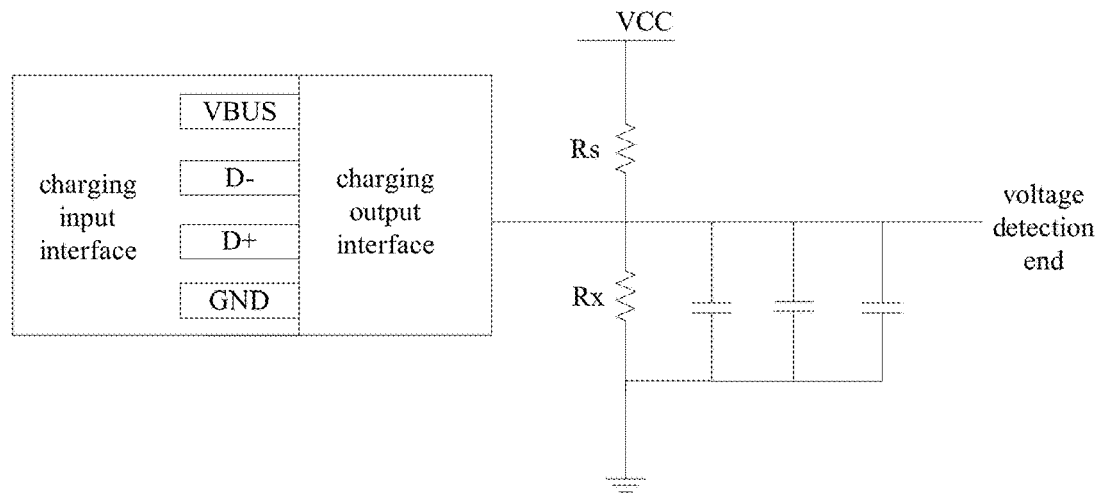

In detail, as illustrated in FIG. 6a, each of the charging input interfaces and charging output interfaces may be a USB interface. The charging input interface of the terminal 100 is coupled with the preset power supply VCC (the voltage of which may be 3.3V) via the pull-up resistor Rs, and the charging output interface of the power adapter is grounded via the pull-down resistor Rx. The first controller 110 determines the number of charging output interfaces coupled with the charging input interfaces by detecting the voltage at the voltage detection end. When the voltage detected by the first controller 110 is 3.3V, the charging input interface is not coupled with the charging output interface. As illustrated in FIG. 6b, when the voltage detected by the first controller 110 is less than 3.3V, the charging input interface is coupled with the charging output interface. In this way, the first controller 110 may automatically detect whether the charging output interface is coupled with the charging input interface and the number of the charging output interfaces coupled with the charging input interfaces.

It can be understood that, in embodiments of the present disclosure, the power adapter can be coupled with the charging input interfaces of the terminal via a charging line, details of which can refer to FIG. 4a and FIG. 4b, which will not be elaborated here.

In actual implementation, the M charging input interfaces may be welded on a flexible circuit board, which is coupled to the first controller 110 via a board to board connector.

In addition, it should be noted that, with respect to details not disclosed in this embodiment, reference can be made to description in the charging system according to embodiments of the present disclosure, which will not be elaborated here.

With the terminal according to embodiments of the present disclosure, the first controller is coupled to the M charging input interfaces and the battery respectively, and when at least one of the N charging output interfaces of the power adapter is coupled to the charging input interfaces, the first controller determines the number of charging output interfaces of the power adapter coupled to the charging input interfaces, and adjusts via the power adapter, the charging current outputted from the power adapter to the battery according to the number of charging output interfaces of the power adapter coupled to the charging input interfaces. With the terminal, the battery is charged via the plurality of charging input interfaces, which may effectively solve the problem of being unable to enhance the charging current due to the limited overcurrent capacity of a single charging input interface, and thus solve the problem of quick charging.

Figure 7:
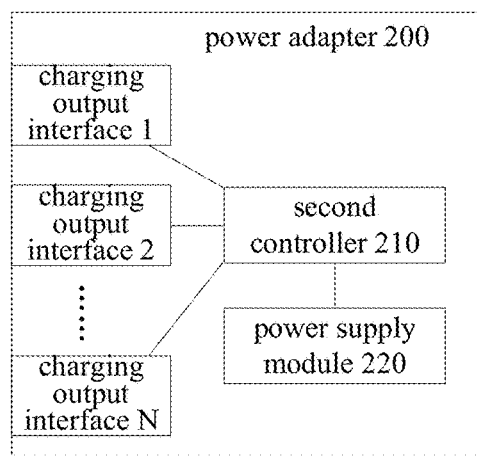
FIG. 7 is a block diagram of a power adapter according to embodiments of the present disclosure.

FIG. 7 is a block diagram of a power adapter according to embodiments of the present disclosure. As illustrated in FIG. 7, the power adapter 200 includes N charging output interfaces, a second controller 210 and a power supply module 220.

The second controller 210 is coupled to power supply module 220 and the N charging output interfaces respectively. The second controller 210 is configured to determine a number of charging output interfaces coupled to a terminal when at least one of the N charging output interfaces is coupled to charging input interfaces of the terminal, and to adjust a charging current outputted from the power supply module 220 to the terminal according to the number of charging output interfaces coupled to the terminal, where N is an integer greater than 1.

In detail, a plurality of charging output interfaces may be provided on the power adapter 200. When there is a need for quick charging, the plurality of charging input interfaces of the terminal may be coupled with the plurality of charging output interfaces of the power adapter 200. Then, the second controller 210 determines the number of charging output interfaces coupled to the terminal, and adjusts the charging current outputted from the power supply module 220 to the terminal according to the number.

According to an embodiment of the present disclosure, when the number of charging output interfaces coupled to the terminal is k, the second controller 210 adjusts the charging current outputted from the power supply module 220 to the terminal to k times a preset charging current, where k is an integer greater than or equal to 1.

In detail, assume that each of the charging input interfaces and the charging output interfaces has the same overcurrent capacity, and the corresponding charging current is the preset charging current, then when the number of charging output interfaces coupled to the terminal is k, the charging current outputted from the power supply module 220 to the terminal can be enhanced to k time the preset charging current.

For example, when one charging input interface of the terminal is coupled with one charging output interface of the power adapter 200, the charging current is 1 times the preset charging current; when two charging input interfaces of the terminal are coupled with two charging output interfaces of the power adapter 200, the charging current is 2 times the preset charging current, each interface being corresponding to 1 times the preset charging current; and so on. The power adapter charges the terminal via the plurality of charging output interfaces, which may effectively solve the problem of being unable to enhance the charging current due to the limited overcurrent capacity of a single charging output interface, and thus solve the problem of quick charging.

According to an embodiment of the present disclosure, each of the N charging output interfaces is coupled to a preset power supply via a pull-up resistor, and the second controller 210 is configured to determine the number of charging output interfaces coupled to the terminal according to the voltage of each charging output interface. Each of the N charging output interfaces may be a USB interface.

In detail, each of the charging input interfaces and charging output interfaces may be a USB interface. The charging output interface of the power adapter 200 is coupled with the preset power supply VCC (the voltage of which may be 3.3V) via the pull-up resistor Rs, and the charging input interface of the terminal is grounded via the pull-down resistor Rx. The second controller 210 determines the number of charging output interfaces coupled with the charging input interfaces by detecting the voltage at the voltage detection end. When the voltage detected by the second controller 210 is 3.3V, the charging output interface is not coupled with the charging input interface. When the voltage detected by the second controller 210 is less than 3.3V, the charging output interface is coupled with the charging input interface. In this way, the second controller 210 may automatically detect whether the charging output interface is coupled with the charging input interface and the number of the charging output interfaces coupled with the charging input interfaces.

It can be understood that, in embodiments of the present disclosure, the power adapter can be coupled with the charging input interfaces of the terminal via a charging line, which will not be elaborated here.

In addition, it should be noted that, with respect to details not disclosed in this embodiment, reference can be made to description in the charging system according to embodiments of the present disclosure, which will not be elaborated here.

With the power adapter according to embodiments of the present disclosure, the second controller is coupled to the power supply module and the N charging output interfaces respectively, and when at least one of the N charging output interfaces is coupled to charging input interfaces of the terminal, the second controller determines the number of charging output interfaces coupled to the terminal and adjusts the charging current outputted from the power supply module to the terminal according to the number of charging output interfaces coupled to the terminal. The power adapter supplies power for the terminal via the plurality of charging output interfaces, which may effectively solve the problem of being unable to enhance the charging current due to the limited overcurrent capacity of the single charging output interface, and thus solve the problem of quick charging.

Figure 8:
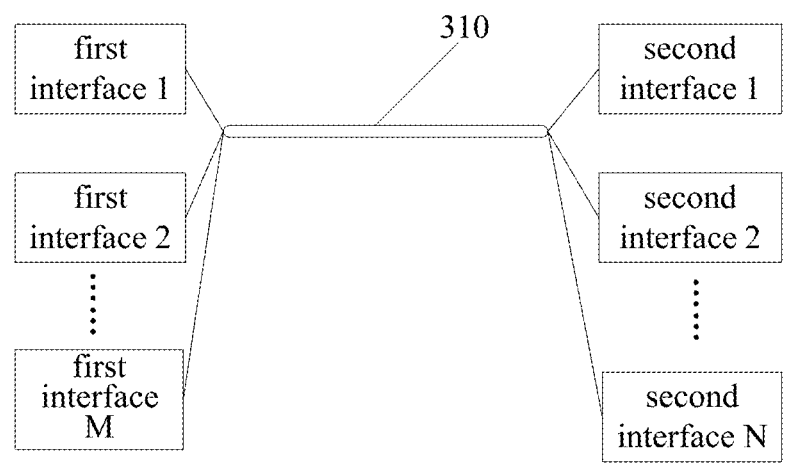
FIG. 8 is a block diagram of a charging line according to embodiments of the present disclosure.

FIG. 8 is a block diagram of a charging line according to embodiments of the present disclosure. As illustrated in FIG. 8, the charging line includes a connecting line 210, M first interfaces, and N second interfaces.

Each of the M first interfaces is coupled with a first end of the connecting line 210, and the M first interfaces are arranged to match the charging input interfaces of the terminal. Each of the N second interfaces is coupled with a second end of the connecting line 210, and the N second interfaces are arranged to match the charging output interfaces of the power adapter. M and N are integers greater than 1.

In detail, as illustrated in FIG. 2, when the user does not require quick charging, the first interface 1 of the charging line may be coupled with the charging input interface 1, and the second interface 1 may be coupled with the charging output interface 1. In this case, the charging current outputted from the power adapter to the terminal via the charging line may be one times the preset charging current.

As illustrated in FIG. 3, when the user requires quick charging, the first interface 1 and the first interface 2 of the charging line may be coupled with the charging input interface 1 and the charging input interface 2 respectively, and the second interface 1 and the second interface 2 of the charging line may be coupled with the charging output interface 1 and the charging output interface 2 respectively. In this case, the charging current outputted from the power adapter to the terminal via the charging line may be two times the preset charging current. Since the charging line has the plurality of first interfaces and the plurality of second interfaces, the power adapter may charge the terminal via the plurality of first interfaces and the plurality of second interfaces, such that the charging current may be enhanced, effectively solving the problem of being unable to enhance the charging current due to only one interface at each end of the charging line.

It should be noted that, in embodiments of the present disclosure, the charging line 300 may be a wire harness, the wire harness consisting of a plurality of single connecting lines, each single connecting line being coupled with one first interface and one second interface. Or, the charging line 300 may consist of one connecting line 310, one first interface, and one second interface, and when there is a need for quick charging, the power adapter can be coupled with the terminal via a plurality of charging lines.

According to an embodiment of the present disclosure, each of the M first interfaces is grounded via a pull-down resistor, and each of the N second interfaces is grounded via a pull-down resistor. Each of the M first interfaces and N second interfaces may be a USB interface.

In detail, each of the M first interfaces, the N second interfaces, the charging input interfaces of the terminal, and the charging output interfaces of the power adapter may be a USB interface. As illustrated in FIG. 4a, the charging output interface of the power adapter may be coupled with the preset power supply VCC (the voltage of which may be 3.3V) via the pull-up resistor Rs, and the second interface of the charging line may be grounded via the pull-down resistor Rx. In this case, the power adapter may determine whether the charging output interface is coupled with the second interface by detecting the voltage at the voltage detection end (i.e., the voltage of the USB interface) in real time. When the voltage of the USB interface detected by the power adapter is 3.3V, the charging output interface is not coupled with the second interface. As illustrated in FIG. 4b, when the voltage of the USB interface detected by the power adapter is less than 3.3V, the charging output interface is coupled with the second interface. In this way, the power adapter may automatically detect whether the charging output interface is coupled with the second interface and the number of the charging output interfaces coupled with the second interfaces.

Similarly, the charging input interface of the terminal may be coupled with the preset power supply VCC (the voltage of which may be 3.3V) via the pull-up resistor Rs, and the first interface of the charging line may be grounded via the pull-down resistor Rx. In this case, the terminal may determine whether the charging input interface is coupled with the first interface by detecting the voltage at the voltage detection end (i.e., the voltage of the USB interface) in real time. When the voltage of the USB interface detected by the terminal is 3.3V, the charging input interface is not coupled with the first interface. When the voltage of the USB interface detected by the terminal is less than 3.3V, the charging input interface is coupled with the first interface. In this way, the terminal may automatically detect whether the charging input interface is coupled with the first interface and the number of the charging input interfaces coupled with the first interfaces.

Then, the power adapter and the terminal communicate with each other, to determine the number of charging output interfaces of the power adapter coupled to the terminal via the charging line. Finally, the charging current outputted from the power adapter to the terminal is adjusted according to the number of charging output interfaces coupled to the terminal, to realize the purpose of quick charging.

In addition, it should be noted that, for details not disclosed in this embodiment, reference may be made to description in the charging system according to embodiments of the present disclosure, which will not be elaborated here.

With the charging line according to embodiments of the present disclosure, one end of the connecting line has M first interfaces, the other end of the connecting line has N second interfaces, and the M first interfaces are arranged to match the charging input interfaces of the terminal, and the N second interfaces are arranged to match the charging output interfaces of the power adapter, such that a plurality of charging output interfaces of a power adapter can be simultaneously coupled with a plurality of charging input interfaces of a terminal, and thus the power adapter can charge the terminal via the plurality of charging output interfaces and the plurality of charging input interfaces, which effectively solves a problem that, when each end of the charging line has one interface, it is unable to enhance the charging current due to the limited overcurrent capacity of the interface, and thus solves the problem of quick charging.

It should be noted that, in the description of the present disclosure, terms such as "first" and "second" are used herein for purposes of description and are not intended to indicate or imply relative importance or imply the number of indicated technical features. Therefore, the feature defined with "first" or "second" implicitly or explicitly includes at least one the feature. In the description of the present disclosure, "a plurality of" refers to two or more unless otherwise specified.

In the description of the present disclosure, unless specified or limited otherwise, the terms such as "mounted," "connected," "coupled" and "fixed" should be understood in a broad sense, for example, may be in fixed connection, and may also be in detachable connection, or integrated into one; may be in mechanical connection, and may also be in electrical connection; may be in direct connection, and may also be connected via intermediate medium; may be intercommunication inside two elements or interactive relationship between two elements. Those skilled in the art may understand the particular meaning of the above terms in the present disclosure according to Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the above phrases in various places throughout this specification are not necessarily referring to the same embodiment or example of the present disclosure. Furthermore, the particular features, structures, materials, or characteristics may be combined in any suitable manner in one or more embodiments or examples. Moreover, without contradiction, those skilled in the art may combine different embodiments or examples described in the present disclosure or features in different embodiments or examples.

Although embodiments of the present disclosure have been described above, it would be appreciated by those skilled in the art that the above embodiments are exemplary and cannot be construed to limit the present disclosure, and those skilled in the art can make changes, alternatives, variants and modifications in the embodiments without departing from scope of the present disclosure.

What is claimed is:

1. A charging system, comprising:
    a terminal, comprising a first controller and M charging input interfaces, where M is an integer greater than 1;
    a power adapter, comprising a second controller and N charging output interfaces, where N is an integer greater than 1;
    wherein, when a quick charging is required, a plurality of charging input interfaces of the terminal are coupled to a plurality of charging output interfaces of the power adapter, and a charging current outputted from the power adapter to the terminal is adjusted to k times a preset charging current according to the number of charging output interfaces of the power adapter coupled to the terminal, where k is an integer greater than or equal to 1, an overcurrent capacity of each charging input interface is the preset charging current, and an overcurrent capacity of each charging output interface is the preset charging current;
    wherein, the first controller is configured to determine the number of charging output interfaces of the power adapter coupled to the terminal, and transmit the number of charging output interfaces to the second controller; and
    wherein the second controller is configured to determine the number of charging output interfaces of the power adapter coupled to the terminal, use a minimum of the number of charging output interfaces determined by the first controller and the number of charging output interfaces determined by the second controller as a final number of charging output interfaces, and adjust the charging current outputted from the power adapter to the terminal according to the final number of charging output interfaces.

2. The charging system according to claim 1, further comprising:
    a charging line, wherein a first end of the charging line comprises M first interfaces matching the M charging input interfaces, a second end of the charging line comprises N second interfaces matching the N charging output interfaces, and the charging output interface of the power adapter is coupled to the charging input interface of the terminal via the charging line.

3. The charging system according to claim 2, wherein each of the M charging input interfaces is coupled to a preset power supply via a pull-up resistor, and each of the M first interfaces is grounded via a pull-down resistor;
    each of the N charging output interfaces is coupled to the preset power supply via the pull-up resistor, and each of the N second interfaces is grounded via the pull-down resistor, wherein
    the number of charging output interfaces of the power adapter coupled to the terminal is determined according to a voltage of each charging input interface and a voltage of each charging output interface.

4. The charging system according to claim 1, wherein each of the M charging input interfaces, the M first interfaces, the N second interfaces, and the N charging output interfaces is a USB interface.

5. A terminal, applied in the charging system according to claim 1, comprising:
    M charging input interfaces, where M is an integer greater than 1;
    a battery; and
    a first controller, coupled to the M charging input interfaces and the battery respectively,
    wherein, when a quick charging is required, a plurality of charging input interfaces of the terminal are coupled to a plurality of charging output interfaces of a power adapter, and a charging current outputted from the power adapter to the terminal is adjusted to k times a preset charging current according to the number of charging output interfaces of the power adapter coupled to the terminal, where k is an integer greater than or equal to 1, an overcurrent capacity of each charging input interface is the preset charging current, and an overcurrent capacity of each charging output interface is the preset charging current;
    wherein, the first controller is configured to determine the number of charging output interfaces of the power adapter coupled to the terminal, and send the number of charging output interfaces to a second controller, such that the second controller determines the number of charging output interfaces of the power adapter coupled to the terminal, uses a minimum of the number of charging output interfaces determined by the first controller and the number of charging output interfaces determined by the second controller as a final number of charging output interfaces, and adjusts the charging current outputted from the power adapter to the terminal according to the final number of charging output interfaces.

6. The terminal according to claim 5, wherein each of the M charging input interfaces is coupled to a preset power supply via a pull-up resistor,
wherein the first controller is configured to determine the number of charging output interfaces of the power adapter coupled to the charging input interfaces according to a voltage of each charging input interface.

7. The terminal according to claim 6, wherein each of the M charging input interfaces is a USB interface.

8. A power adapter, applied in the charging system according to claim 1, comprising:
a power supply module;
N charging output interfaces, where N is an integer greater than 1; and
a second controller, coupled to the power supply module and the N charging output interfaces respectively,
wherein, when a quick charging is required, a plurality of charging input interfaces of a terminal are coupled to a plurality of charging output interfaces of the power adapter, and a charging current outputted from the power adapter to the terminal is adjusted to k times a preset charging current according to the number of charging output interfaces of the power adapter coupled to the terminal, where k is an integer greater than or equal to 1, an overcurrent capacity of each charging input interface is the preset charging current, and an overcurrent capacity of each charging output interface is the preset charging current;
wherein the second controller is configured to determine the number of charging output interfaces of the power adapter coupled to the terminal, use a minimum of the number of charging output interfaces determined by a first controller and the number of charging output interfaces determined by the second controller as a final number of charging output interfaces, and adjust the charging current outputted from the power adapter to the terminal according to the final number of charging output interfaces, in which the first controller is configured to determine the number of charging output interfaces of the power adapter coupled to the terminal, and send the number of charging output interfaces to the second controller.

9. The power adapter according to claim 8, wherein, each of the N charging output interfaces is coupled to a preset power supply via a pull-up resistor,
wherein, the second controller is configured to determine the number of charging output interfaces coupled to the terminal according to a voltage of each charging output interface.

10. The power adapter according to claim 9, wherein, each of the N charging output interfaces is a USB interface.

* * * * *